United States Patent
Nolin et al.

(10) Patent No.: US 11,818,980 B2
(45) Date of Patent: Nov. 21, 2023

(54) TRIMMER LINE WITH CENTERING FEATURE

(71) Applicant: TTI (MACAO COMMERCIAL OFFSHORE) LIMITED, Macau (MO)

(72) Inventors: Eric Nolin, Anderson, SC (US); Robert L. Morrison, Shreveport, LA (US)

(73) Assignee: TECHTRONIC OUTDOOR PRODUCTS TECHNOLOGY LIMITED, Hamilton (BM)

( * ) Notice: Subject to any disclaimer, the term of this patent is extended or adjusted under 35 U.S.C. 154(b) by 0 days.

(21) Appl. No.: 15/788,879

(22) Filed: Oct. 20, 2017

(65) Prior Publication Data
US 2018/0110182 A1 Apr. 26, 2018

Related U.S. Application Data

(60) Provisional application No. 62/410,762, filed on Oct. 20, 2016.

(51) Int. Cl.
*A01D 34/416* (2006.01)

(52) U.S. Cl.
CPC ..... *A01D 34/4168* (2013.01); *A01D 34/4166* (2013.01); *A01D 34/4163* (2013.01)

(58) Field of Classification Search
CPC ............ A01D 34/4168; A01D 34/4166; A01D 34/4163; A01D 34/416; Y10T 83/853
USPC ........................................................ 30/276
See application file for complete search history.

(56) References Cited

U.S. PATENT DOCUMENTS

| | | | | |
|---|---|---|---|---|
| 1,982,304 | A * | 11/1934 | Holden | A01K 91/00 428/364 |
| 3,667,129 | A * | 6/1972 | Aspel | A61C 7/02 33/666 |
| 3,831,278 | A | 8/1974 | Voglesonger | |
| 4,054,993 | A * | 10/1977 | Kamp | A01D 34/4168 30/276 |
| 4,089,114 | A | 5/1978 | Doolittle et al. | |
| 4,186,239 | A * | 1/1980 | Mize | A01D 34/4168 30/276 |

(Continued)

FOREIGN PATENT DOCUMENTS

| | | |
|---|---|---|
| CN | 102781215 A | 11/2012 |
| CN | 107302865 A | 10/2017 |

(Continued)

OTHER PUBLICATIONS

Australian Patent Office Examination Report for Application No. 2017248539 dated Sep. 21, 2018, 4 pages.

(Continued)

*Primary Examiner* — Evan H MacFarlane
*Assistant Examiner* — Fernando A Ayala
(74) *Attorney, Agent, or Firm* — Michael Best & Friedrich LLP

(57) ABSTRACT

A trimmer line for use with a trimmer head having an outer diameter and defining an axis of rotation. The trimmer line may include an elongated body having a first end, an opposite second end, and a center between the first end and the second end. The trimmer line also may also include indicia formed on the elongated body and spaced from the center point a distance greater than or equal to about half the outer diameter.

5 Claims, 3 Drawing Sheets

(56) References Cited

U.S. PATENT DOCUMENTS

| | | | | |
|---|---|---|---|---|
| 4,571,831 | A * | 2/1986 | White, III | A01D 34/416 |
| | | | | 30/276 |
| 5,170,561 | A | 12/1992 | Sepke | |
| 5,220,774 | A * | 6/1993 | Harbeke | A01D 34/4168 |
| | | | | 30/276 |
| 5,871,091 | A * | 2/1999 | Fogle | B65D 81/22 |
| | | | | 206/205 |
| 6,045,911 | A | 4/2000 | Legrand et al. | |
| 6,094,823 | A * | 8/2000 | Brown | A01D 34/416 |
| | | | | 30/276 |
| 6,094,825 | A * | 8/2000 | Hinson | A01D 34/4166 |
| | | | | 30/276 |
| 6,842,984 | B1 | 1/2005 | Grant et al. | |
| 6,874,235 | B1 * | 4/2005 | Legrand | A01D 34/4168 |
| | | | | 30/276 |
| 6,986,239 | B1 | 1/2006 | Compton | |
| 7,257,898 | B2 | 8/2007 | Iacona | |
| 8,721,468 | B1 * | 5/2014 | Barrett | A63B 43/008 |
| | | | | 473/280 |
| 8,863,395 | B2 | 10/2014 | Alliss | |
| 8,910,387 | B2 * | 12/2014 | Alliss | A01D 34/4162 |
| | | | | 30/276 |
| 2005/0188544 | A1 | 9/2005 | Legrand | |
| 2005/0257940 | A1 | 11/2005 | Jerez | |
| 2011/0119932 | A1 | 5/2011 | Pfaltzgraff et al. | |
| 2011/0308371 | A1 * | 12/2011 | Morita | B23D 61/185 |
| | | | | 83/830 |
| 2011/0314785 | A1 | 12/2011 | Flädjemark | |
| 2012/0126051 | A1 * | 5/2012 | Legrand | A01D 34/4168 |
| | | | | 242/604 |
| 2012/0208021 | A1 * | 8/2012 | Yang | A01D 34/4168 |
| | | | | 428/400 |
| 2014/0115904 | A1 | 5/2014 | Wadge et al. | |
| 2015/0305234 | A1 * | 10/2015 | Guenther | A01D 34/4167 |
| | | | | 30/276 |
| 2015/0342117 | A1 | 12/2015 | Alliss | |
| 2016/0123375 | A1 * | 5/2016 | Edgman | F16C 1/26 |
| | | | | 30/276 |
| 2016/0369425 | A1 * | 12/2016 | Truhill | D02G 3/38 |
| 2017/0238461 | A1 * | 8/2017 | Cabrera | A01D 34/4163 |
| 2018/0020615 | A1 * | 1/2018 | Alliss | A01D 34/4163 |
| | | | | 30/276 |
| 2019/0003464 | A1 * | 1/2019 | Ka ner | H02G 11/00 |
| 2020/0281116 | A1 * | 9/2020 | Guo | A01D 34/4168 |

FOREIGN PATENT DOCUMENTS

| | | |
|---|---|---|
| CN | 109963456 A | 7/2019 |
| EP | 2923548 A1 | 9/2015 |
| WO | 2009124593 A1 | 10/2009 |

OTHER PUBLICATIONS

Chinese Patent Office Action for Application No. 201710998714.X dated Nov. 3, 2021 (8 pages including statement of relevance).

* cited by examiner

TRIMMER LINE WITH CENTERING FEATURE

CROSS-REFERENCE TO RELATED APPLICATION

This patent application claims priority to U.S. Provisional Patent Application No. 62/410,762, filed Oct. 20, 2016, the entire contents of which is hereby incorporated by reference.

FIELD

The present invention relates to trimmer lines and, more particularly, to a trimmer line with a centering feature.

SUMMARY

Generally, trimmers are used to cut grass and weeds and are often used to edge around trees, near fences and walls, along landscape borders, etc. Conventional string trimmers include an elongated shaft with a rotating element or gear head near the end of the elongated shaft, and a trimmer head attached to the gear head. Typically, the trimmer head is configured to receive and retain one or more trimmer lines therein such that the trimmer head rotates the trimmer line(s) allowing the trimmer line to cut and trim along landscaped areas, fences, walls, etc.

In one independent embodiment, a trimmer line for use with a trimmer head may be provided, the trimmer head having an outer diameter. The trimmer line may generally include an elongated body having a first end, an opposite second end, and a center between the first end and the second end. The trimmer line may also include indicia formed on the elongated body and spaced from the center a distance greater than or equal to about half the outer diameter.

In another independent embodiment, a trimmer line for use with a trimmer head may be provided, the trimmer head defining an axis of rotation. The trimmer line may generally include an elongated body having a first end, an opposite second end, and a center between the first end and the second end. The trimmer line may also include a centering feature configured to align the center of the elongated body with the axis of rotation of the trimmer head, the centering feature being configured to be visible outside the trimmer head when the center is substantially aligned with the axis.

In yet another independent embodiment, a trimmer line for use with a trimmer head may be provided, the trimmer head having an outer diameter. The trimmer line may generally include an elongated body having a first end, an opposite second end, first indicia on the elongated body, and second indicia on the elongated body, the second indicia being spaced from the first indicia by a distance greater than or equal to about the outer diameter.

In a further independent embodiment, a method for loading a trimmer line in a trimmer head may be provided, the trimmer head including an outer diameter and defining an axis of rotation, the trimmer line including a first end, an opposite second end and a center between the first end and the second end. The method may generally include positioning the trimmer line in the trimmer head with indicia on the elongated body visible from outside the trimmer head when the center substantially aligned with the axis; and winding the trimmer line on the trimmer head.

Other independent aspects of the invention may become apparent by consideration of the detailed description, claims and accompanying drawings.

Before any independent constructions of the invention are explained in detail, it is to be understood that the invention is not limited in its application to the details of construction and the arrangement of components set forth in the following description or illustrated in the following drawings. The invention is capable of other independent constructions and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

DETAILED DESCRIPTION

FIGS. 1-8a illustrate a trimmer line 10 for use with a wind-up style trimmer head 14. In the illustrated constructions, the trimmer line 10 includes a centering feature 70 to properly position the trimmer line 10 within the trimmer head 14 during the loading operation. Once loaded, a powered trimmer (not shown) rotates the trimmer head 14 and the trimmer line 10 to cause the trimmer line 10 to cut vegetation such as grass, weeds, etc.

Figure 1:
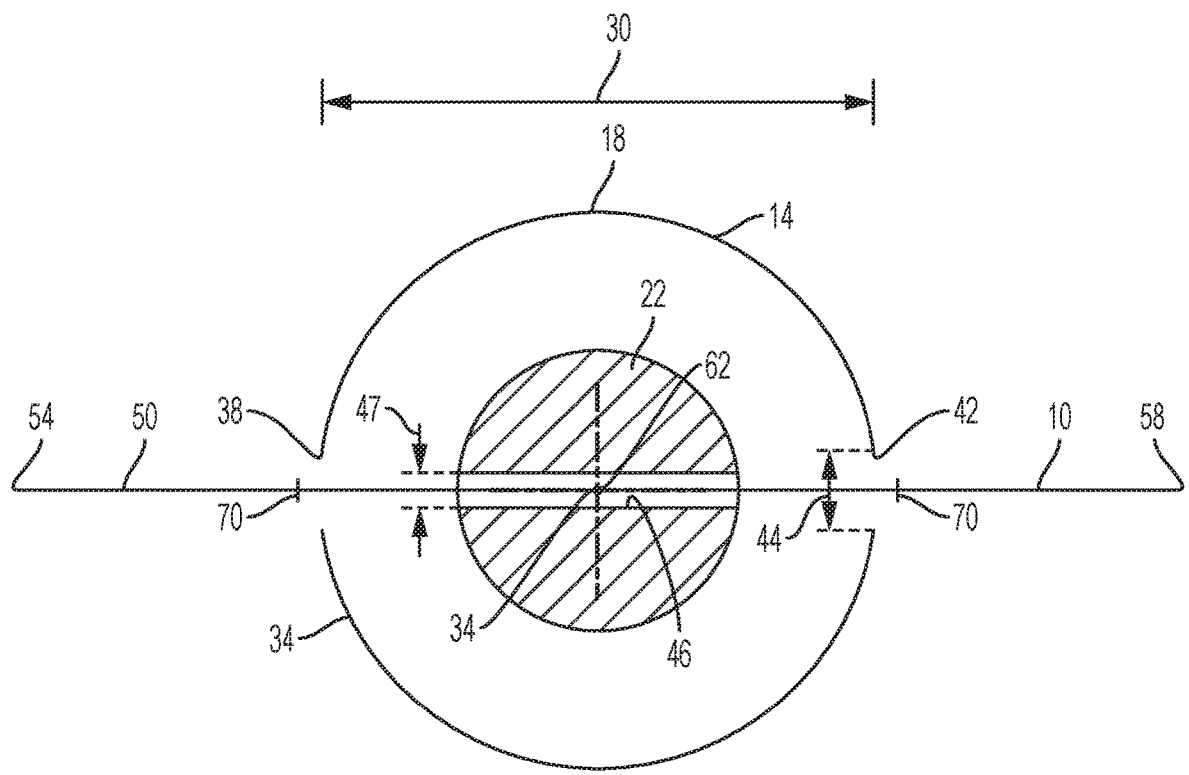
FIG. 1 is a schematic view of a trimmer head with a trimmer line positioned therein.
Figure 2:
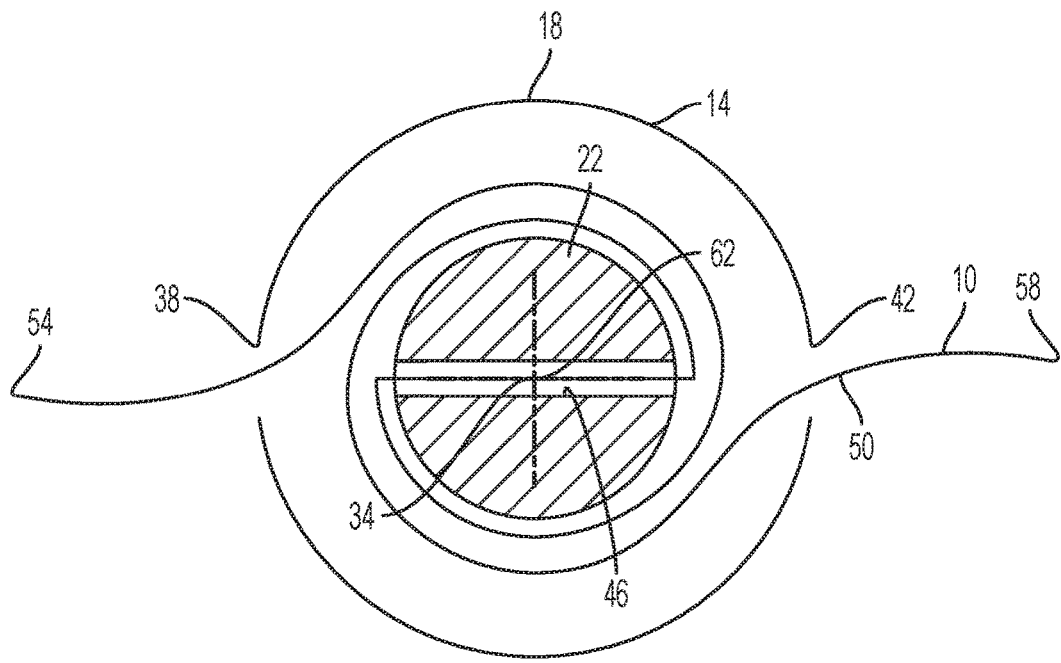
FIG. 2 is a schematic view of the trimmer head of FIG. 1, with the line wound on the inner housing.

Referring to FIGS. 1 and 2, the illustrated trimmer head 14 includes an outer housing 18, an inner housing 22 rotatable with respect to the outer housing 18, and feed mechanism (e.g., a bump knob (not shown)) to selectively permit the inner housing 22 to rotate with respect to the outer housing 18. During use, the trimmer head 14 at least partially receives and stores the trimmer line 10 by spooling a portion of the trimmer line 10 therein (FIG. 1). The trimmer head 14 is configured to release a pre-determined length of the trimmer line 10 from the trimmer head 14 (e.g., unspool) each time the feed mechanism is actuated.

While the illustrated trimmer head 14 is configured to receive and support a single length of trimmer line 10 therein, it is understood that the trimmer head 14 may be modified to accept additional trimmer lines (not shown) as necessary to produce the desired trimming characteristics.

The outer housing 18 of the trimmer head 14 is substantially cylindrical in shape defining a diameter 30 (FIG. 1) and an axis of rotation 34. The outer housing 18 includes a substantially annular outer wall 34 defining a first aperture 38 and an opposite second aperture 42. In the illustrated construction, the apertures 38, 42 each have a width 44 and are sized to allow the trimmer line 10 to pass therethrough.

The inner housing 22 of the trimmer head 18 is positioned at least partially inside the outer housing 18 and is configured to selectively rotate with respect to the outer housing 18 about the axis of rotation 34. The illustrated inner housing 22 defines a channel 46 extending radially therethrough and having a channel width 47 sized to allow at least a portion of the trimmer line 10 to be positioned therein.

During use, rotation of the inner housing 22 in a first direction (e.g., clockwise in FIG. 2) with respect to the outer housing 18 causes at least a portion of the trimmer line 10 to be wound about an outer surface of the inner housing 22. In contrast, rotation of the inner housing 22 in an opposite second direction (e.g., counterclockwise in FIG. 2) with respect to the outer housing 18 causes at least a portion of the trimmer line 10 to be unwound from the outer surface of the inner housing 22.

As illustrated in FIGS. 1-8a, the trimmer line 10 is substantially elongated in shape and has a body 50 with a first end 54 and an opposite second end 58. The trimmer line 10 also has a center or center point 62 between and substantially equidistant from ends 54, 58. The trimmer line 10 also defines a length 66 between the ends 54, 58.

In the illustrated construction, the trimmer line 10 has a monofilament construction including a substantially circular cross-section along its length. However, in other constructions (not shown), the trimmer line 10 may be formed from any durable yet flexible material and/or may include multiple individual strands of material woven together. In still other constructions (not shown), the trimmer line 10 may have different cross-sectional shapes such as, but not limited to, elongated, ribbon-shaped, blade-shaped, etc. In still other constructions (not shown), the cross-sectional shape of the trimmer line 10 may vary along its length.

The illustrated trimmer line 10 includes a centering feature 70 configured to allow the user to properly position the trimmer line 10 within the trimmer head 14 during the loading process. More specifically, the illustrated centering feature 70 aids the user in assuring that the center point 62 is substantially aligned with the axis of rotation 34 of the trimmer head 14 for loading. As illustrated, the centering feature 70 ensures that substantially equal lengths of trimmer line 10 extend from the first aperture 38 and the second aperture 42.

The centering feature 70 provides visual, tactile, or audible feedback to the user when the trimmer line 10 is at or near the desired location. The illustrated centering feature 70 is configured to substantially align the geometric center (e.g., the center point 62) of the trimmer line 10 with the axis of rotation 34 of the trimmer head 14. In other constructions (not shown), the centering feature 70 may be configured to align the center of gravity (not shown) or any other point of the trimmer line 10 with the axis of rotation 34 of the trimmer head 14.

Figure 3:
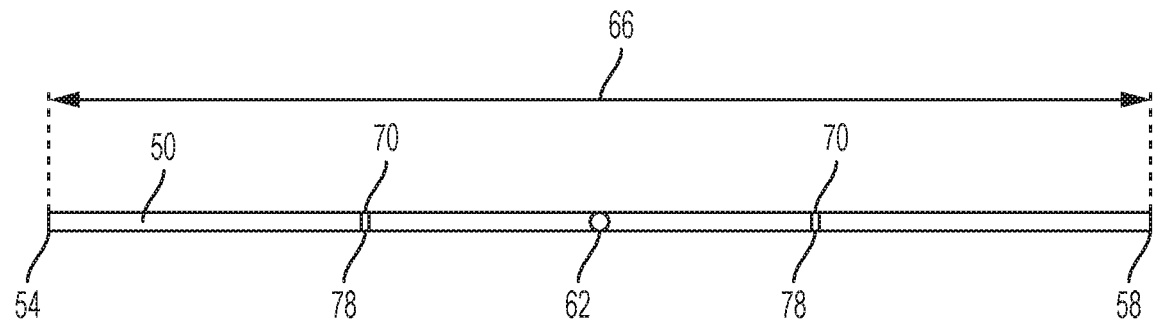
FIGS. 3-8a illustrate various alternative constructions of the trimmer line of FIG. 1.

FIG. 3 illustrates one construction of the centering feature 70. As illustrated, the trimmer line 10 includes a pair of indicia 78, each applied to the body 50, to allow the user to visually position the trimmer line 10 within the trimmer head 14. The indicia 78 are each positioned equidistance from the center point 62 and spaced apart from one another by a distance substantially equal to the diameter 30 of the outer housing 18 of the trimmer head 14. As such, both indicia 78 will be positioned proximate to and substantially aligned with a corresponding aperture 38, 42 of the trimmer head 14 when the trimmer line 10 is properly positioned (i.e., when the center point 62 of the trimmer line 10 is substantially aligned with the axis of rotation 34 of the trimmer head 14).

In some constructions, the indicia 78 are spaced from one another a distance slightly greater than the outer diameter 30 of the trimmer head 14 to assure both indicia 78 are visible when the trimmer line 10 is in the desired position. For example, the indicia 78 may be spaced apart approximately 10 mm for use with a trimmer head 14 having a diameter 30 of approximately 9 mm.

In the illustrated construction, each indicium 78 includes a line printed on and extending circumferentially around the outer surface of the trimmer line 10. However in other constructions (not shown), the indicia 78 may include, among other things, for example, an arrow, one or more dots, a broken line, a manufacturer/distributor insignia/logo, other shapes, etc.

Figure 4:
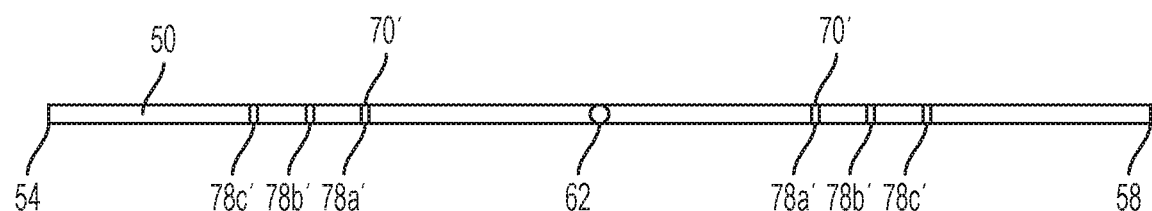

FIG. 4 illustrates another construction of the centering feature 70' of the trimmer line 10, which includes multiple sets of indicia 78a', 78b', 78c'. Each of the indicia 78 corresponds to different trimmer heads having different outer diameters (not shown). Each set of indicia 78a', 78b', 78c' is positioned such that both indicia 78a', 78b', 78c' of a particular set are positioned an equal distance from the center point 62 of the trimmer line 10 (i.e., centered about the center point 62), but at different distances from one another. As such, the user may utilize a different set of indicia 78a', 78b', 78c' depending upon the size (i.e., outer diameter) of the trimmer head 14 in which the trimmer line 10 is to be used. In such constructions, each individual set of indicia 78a', 78b', 78c' may include a unique color or design common to both indicia in the set to assure the different sets can be differentiated from one another during use.

Figure 5:
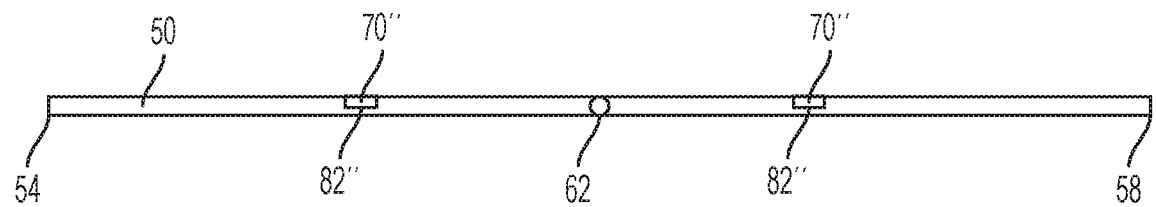

FIG. 5 illustrates yet another construction of the centering feature 70" of the trimmer line 10. In this construction, the centering feature 70" includes a pair of notches 82" formed in the body 50 of the trimmer line 10. In the illustrated construction, each notch 82" is positioned substantially equidistance from the center point 62 and spaced a distance from one another substantially equal to the diameter 30 of the outer housing 18 of the trimmer head 14. As such, each notch 82" will be positioned proximate to and substantially aligned with a corresponding aperture 38, 42 when the trimmer line 10 is properly positioned within the trimmer head 14.

In this construction, the trimmer head 14 includes one or more detents (not illustrated) to interact with the notches 82" and provide an audible click or tactile feedback when the notches 82" are substantially aligned with the apertures 38, 42. In other constructions (not shown), the notches 82" may be centered about the center point 62 of the trimmer line 10 and be spaced a distance from one another substantially corresponding to the periphery of the inner housing 22. In such constructions, the inner housing 22 includes one or more detents (not illustrated) to provide an audible click or tactile feedback when the trimmer line 10 is in the desired position.

Figure 6:
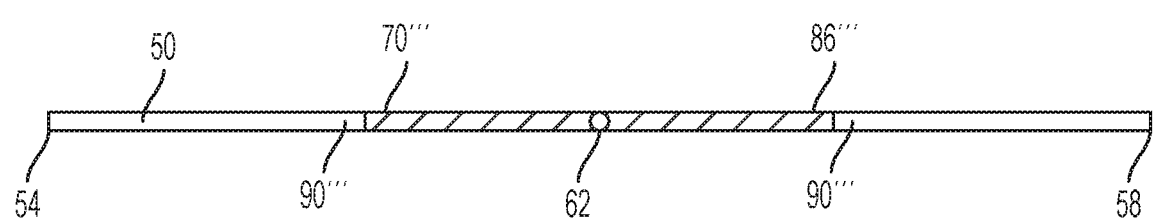

FIG. 6 illustrates a further construction of the centering feature 70''', which includes a center portion 86''' having one or more unique attributes from remaining lateral portions 90''' of the trimmer line 10. The illustrated center portion 86''' of the trimmer line 10 is centered about the center point 62 and extends over a distance of the trimmer line 10 substantially equal to the diameter 30 of the outer housing 18 of the trimmer head 14. The lateral portions 90''' include the remaining two portions of trimmer line 10 extending between the center portion 86''' and the ends 54, 58, respectively. The edges of the center portion 86''' (i.e., the transition between the center portion 86''' and the corresponding lateral portion 90''') are substantially aligned with the apertures 38, 42 of the outer housing 18 of the trimmer head 14 when the trimmer line 10 is properly positioned therein.

In other constructions (not shown), the size of the center portion 86''' may be slightly less than the outer diameter 30 of the trimmer head 14 such that the center portion 86''' is not visible to the user when the trimmer line 10 is in the proper position.

In the illustrated construction, the center portion 86''' is a different color than the lateral portions 90''' of the trimmer line 10. However, in other constructions (not shown), the center portion 86''' may have a different cross-sectional shape, texture, thickness, combinations thereof, etc., than the lateral portions 90''' of the trimmer line 10. In still other constructions (not shown), the centered portion 86''' of the trimmer line 10 may be formed from a different or separate material than the lateral portions 90'''.

Figure 7:
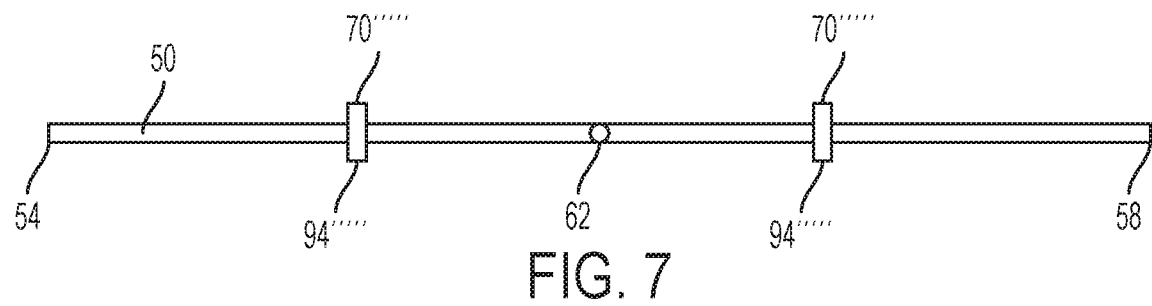

Referring to FIG. 7, another construction of the centering feature 70'''' includes a pair of markers 94'''' coupled to or formed into the trimmer line 10. The markers 94'''' are positioned substantially equidistance from the center point 62 and spaced apart from one another a distance substantially equal to the diameter 30 of the outer housing 18 of the trimmer head 14. As such, both markers 94'''' will be positioned proximate to and substantially aligned with a corresponding aperture 38, 42 when the trimmer line 10 is properly positioned therein. In some constructions, the markers 94'''' are spaced from one another a distance slightly greater than the diameter 30 of the trimmer head 14 to assure both markers 94'''' are visible when the trimmer line 10 is in the desired position.

In the illustrated construction, each marker 94'''' is a separate and substantially cylindrical piece of material coupled to the trimmer line 10 at the appropriate location. In other constructions (not shown), different sizes and shapes of markers 94'''' may be used as necessary to provide the necessary feedback to the user. In some constructions (not shown), either the inner or outer housings 18, 22 may include one or more detents to engage the markers 94'''', thereby providing audible or tactile feedback to the user.

While the centering features 70', 70'', 70''', and 70'''' are shown in pairs, it is understood that a single element may also be used in some constructions.

Figure 8:
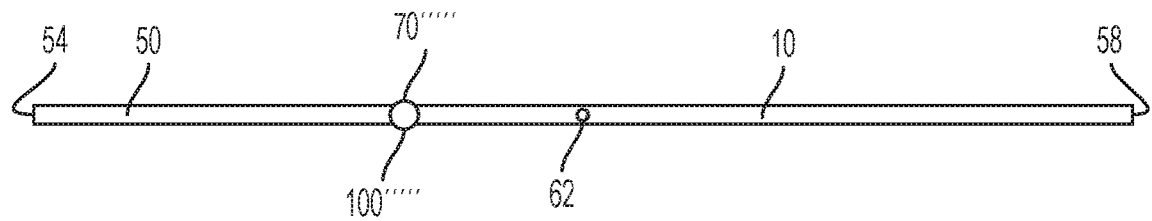
Figure 8A:
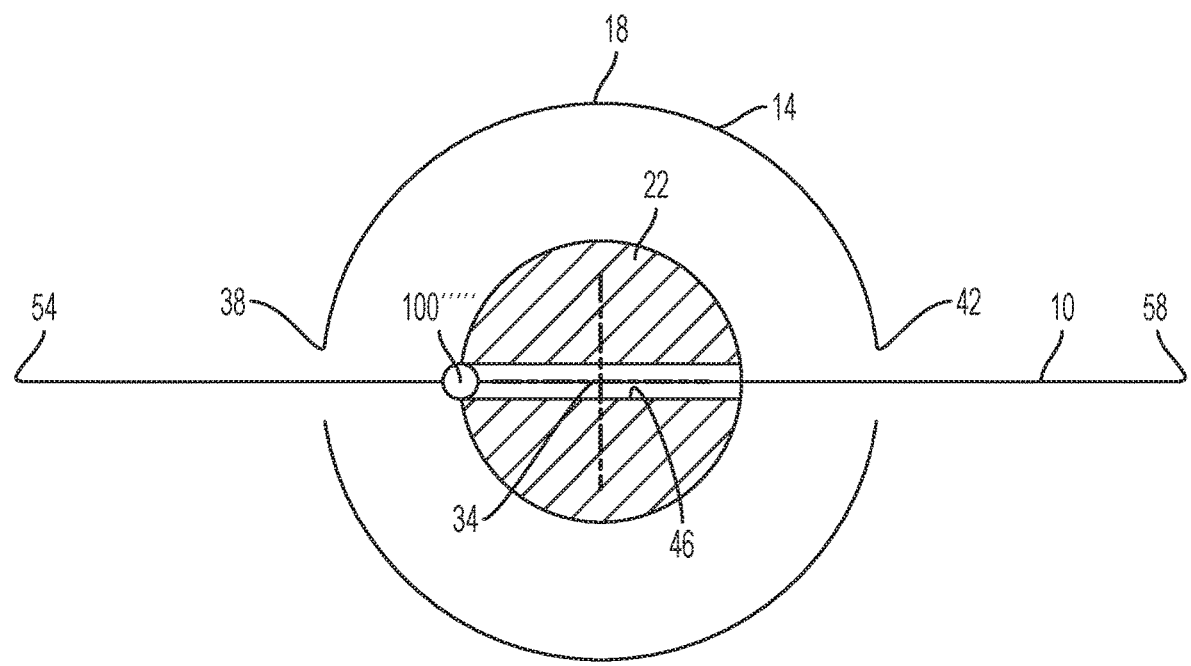

Referring to FIG. 8, in still another construction, of the centering feature 70''''' includes a stop 100''''' formed into or coupled to the trimmer line 10. The stop 100''''' is positioned a distance from the center point 62 approximately half the outer diameter 104 of the inner housing 22. The stop 100''''' is sized such that it is smaller than the diameter 44 of the apertures 38, 42, but larger than the width 47 of the channel 46. As such, the user may insert one end (e.g., the end 58) of the trimmer line 10 into the first aperture 38, through the channel 46, and out the second aperture 42, then continue to feed the line 10 through the trimmer head 14 until the stop 100''''' passes through the first aperture 38 and engages the channel 46 of the inner housing 22 (FIG. 8a), thereby restricting any additional feeding of the trimmer line 10 through the trimmer head 14 after the trimmer line 10 has been properly positioned.

In another construction (not shown), the stop 100''''' may be larger than the diameter 44 of the apertures 38, 42 and will engage the outer surface of the outer housing 18 when the trimmer line 10 is properly positioned.

The stop 100''''' will be closer to one end (e.g., the end 54), and the other end (e.g., the end 58) will be inserted into the trimmer head 14 until the stop 100''''' engages a portion of the trimmer head 14. The end to be inserted (e.g., the end 58) may have an indication to the user to insert that end. Also, once properly aligned, the stop 100''''', if accessible, may be removed from the trimmer line 10 (e.g., removed radially, broken, etc.).

To load the trimmer line 10 into the trimmer head 14, the user first feeds an end (e.g., the end 58) of the trimmer line 10 through the first aperture 38, through the channel 46, and out the second aperture 38 (FIG. 1). The user then advances the trimmer line 10 until the centering feature 70 indicates, via visual, tactile, or audible feedback, that the trimmer line 10 is in the desired position (i.e., the center point 62 is aligned with the axis of rotation 34 of the trimmer head 14). Once loaded, the inner housing 22 is rotated in the first direction with respect to the outer housing 18, causing the body 50 to wrap around the outside of the inner housing 22 (see FIG. 2).

One or more independent features and/or independent advantages of the invention may be set forth in the following claims:

What is claimed is:

1. A trimmer line assembly comprising:
a trimmer head having an axis of rotation and an outer wall defining an outer diameter; and
a trimmer line including:
an elongated body having a first end, an opposite second end, and a center between the first end and the second end,
a first indicia formed on the elongated body and configured to align the center of the elongated body with the axis of rotation of the trimmer head,
a second indicia formed on the elongated body and configured to align the center of the elongated body with the axis of rotation of the trimmer head, and
wherein the first indicia and the second indicia are spaced equidistant from the center of the elongated body, wherein the first indicia is spaced a first distance from the second indicia, and wherein the first distance is equal to the outer diameter of the trimmer head.

2. The trimmer line of claim 1, wherein the center is coincident to a center of gravity of the elongated body.

3. The trimmer line of claim 1, wherein the center is equidistant from the first end and from the second end.

4. The trimmer line of claim 1, wherein the indicia includes a marking printed on an outer surface of the trimmer line.

5. The trimmer line of claim 1, wherein the indicia includes a notch formed into the elongated body.

* * * * *